US009800798B2

(12) United States Patent
Ravirala et al.

(10) Patent No.: US 9,800,798 B2
(45) Date of Patent: Oct. 24, 2017

(54) SYSTEMS AND METHODS FOR POWER OPTIMIZATION FOR IMAGING DEVICES WITH DUAL CAMERAS

(71) Applicant: QUALCOMM Incorporated, San Diego, CA (US)

(72) Inventors: Narayana Karthik Ravirala, San Diego, CA (US); Shizhong Liu, San Diego, CA (US); Karthikeyan Shanmugavadivelu, San Diego, CA (US); Venkata Ravi Kiran Dayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/622,121

(22) Filed: Feb. 13, 2015

(65) Prior Publication Data

US 2016/0241793 A1 Aug. 18, 2016

(51) Int. Cl.
*H04N 5/247* (2006.01)
*H04N 5/225* (2006.01)
*H04N 5/232* (2006.01)

(52) U.S. Cl.
CPC .......... *H04N 5/247* (2013.01); *H04N 5/2258* (2013.01); *H04N 5/23241* (2013.01); *H04N 5/23296* (2013.01)

(58) Field of Classification Search
CPC ............. H04N 5/23296; H04N 5/2257; H04N 5/2626; H04N 5/2332; H04N 5/37452; H04N 5/2258; H04N 5/23232; H04N 9/045; H04N 5/2628; H04N 5/232; H04N 5/247; H04N 5/23241
See application file for complete search history.

(56) References Cited

U.S. PATENT DOCUMENTS

| 5,870,139 A * | 2/1999 | Cooper | H04N 7/181 348/153 |
| 7,561,191 B2 * | 7/2009 | May | H04N 5/2254 348/240.2 |
| 8,456,515 B2 * | 6/2013 | Li | H04N 5/2257 348/42 |

(Continued)

FOREIGN PATENT DOCUMENTS

| EP | 2747413 A1 | 6/2014 |
| WO | WO-2014199338 A2 | 12/2014 |

OTHER PUBLICATIONS

International Search Report and Written Opinion—PCT/US2016/015172—ISA/EPO—dated Apr. 11, 2016.

*Primary Examiner* — Luong T Nguyen
(74) *Attorney, Agent, or Firm* — Knobbe, Martens, Olson & Bear, LLP (57) ABSTRACT

Systems, methods, and devices for power optimization in imaging devices having dual cameras are contained herein. In one aspect, a method for power optimization for a dual camera imaging device is disclosed. The method includes determining a zoom factor selection, determining whether the zoom factor selection falls within a first zoom factor range, a second zoom factor range, or a third zoom factor range, and sending a series of frames of an image captured by a first sensor or a series of frames of an image captured by a second sensor or both to a camera application based on the determined zoom factor section.

17 Claims, 7 Drawing Sheets

(56) References Cited

U.S. PATENT DOCUMENTS

| | | | |
|---|---|---|---|
| 2002/0152557 A1* | 10/2002 | Elberbaum | H04N 5/2253 8/405 |
| 2006/0139463 A1* | 6/2006 | Heinonen | H04N 5/2251 348/239 |
| 2006/0187312 A1 | 8/2006 | Labaziewicz et al. | |
| 2006/0187338 A1 | 8/2006 | May et al. | |
| 2007/0025713 A1 | 2/2007 | Hosono | |
| 2008/0024596 A1 | 1/2008 | Li et al. | |
| 2008/0030592 A1 | 2/2008 | Border et al. | |
| 2009/0295949 A1 | 12/2009 | Ojala | |
| 2011/0249086 A1 | 10/2011 | Guo et al. | |
| 2013/0235234 A1* | 9/2013 | Cucci | H04N 5/23206 348/231.99 |
| 2013/0250159 A1* | 9/2013 | Nagasaka | H04N 5/2254 348/340 |
| 2014/0184854 A1* | 7/2014 | Musatenko | H04N 5/23296 348/240.2 |
| 2014/0232905 A1* | 8/2014 | Jung | H04N 5/265 348/239 |

\* cited by examiner

SYSTEMS AND METHODS FOR POWER OPTIMIZATION FOR IMAGING DEVICES WITH DUAL CAMERAS

BACKGROUND

Technical Field

The present application relates generally to imaging devices, and more particularly to systems, methods, and devices for power optimization in imaging devices with dual cameras.

Background

Many current devices are available for capturing images. For example, current digital cameras and modern cell phones and tablets can all capture and display digital images to a user.

Dual cameras are being increasingly used in cell phones and other mobile devices. Typically, a first camera has a wide angle lens while the second camera has a telephoto lens. Running two cameras simultaneously, however, increases power consumption and decreases battery life of the mobile device. Thus, systems and methods for dual camera applications focusing on power optimization for an optical zoom feature of a dual camera application are needed.

SUMMARY

Dual camera systems on a mobile device, or other device, may include both a telephoto and wide-angle lens. In such dual camera systems, both cameras may be operated at the same time to capture an image of a scene. However, operating the dual cameras simultaneously can increase power consumption and therefore can decrease the battery life of a mobile device.

The systems, methods, devices, and computer program products discussed herein each have several aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

Embodiments and innovations discussed herein relate to systems and methods that may be run in a processor for an electronic device to optimize the power utilization of devices having and/or operating dual cameras. Preferably, the power optimization systems and methods discussed herein can be implemented in existing hardware and software. However, in some embodiments, specially designed hardware and software may improve speed or efficiencies of such processes.

In one innovation, a method for power optimization for a dual camera imaging device is disclosed. The method includes the steps of determining a zoom factor selection for capturing image data; determining whether the zoom factor selection falls within a first zoom factor range, a second zoom factor range, or a third zoom factor range, the first, second and third zoom factor ranges being an amount of zoom; and sending a series of frames of a scene captured by a first sensor or a series of frames of the scene captured by a second sensor or both to a camera application based on the determined zoom factor selection. In some embodiments, the method further includes determining a buffer factor from a warm up period of the second sensor. In some embodiments, the first, second, and third zoom factor ranges are determined using the buffer factor, a field of view (FOV) ratio between the first sensor and the second sensor and a maximum zoom factor of the imaging device. In some embodiments, the FOV ratio is a ratio between the FOV of the first sensor and a FOV of the second sensor and the FOV ratio is less than the maximum zoom factor of the imaging device. In some embodiments, the first zoom factor range is between 1.0 and a difference between the FOV ratio and the buffer factor. In some embodiments, the second zoom factor range is between a difference between the FOV ratio and the buffer factor and the sum of the field of view ratio and the buffer factor. In some embodiments, the third zoom factor range is between the sum of the FOV ratio and the buffer factor and the maximum zoom factor. In some embodiments, the method further includes turning off one of the first and second sensors when the other of the first and second sensors is sending frames to the camera application when the zoom factor is within either of the first and the third zoom factor ranges. In some embodiments, the method further includes sending frames to the camera application from both of the first and second sensors when the zoom factor is within the second zoom factor range.

In another innovation, an apparatus for optimizing operation of a dual camera imaging device includes a processor; a first imaging sensor and a second imaging sensor; and a memory, operably coupled to the processor, and configured to store processor instructions that configure the processor to determine a zoom factor selection; determine whether the zoom factor selection falls within a first zoom factor range, a second zoom factor range, or a third zoom factor range; and send a series of frames of a scene captured by a first sensor or a series of frames of the scene captured by a second sensor or both to a camera application based on the determined zoom factor section. In some embodiments, the apparatus further includes a touch device configured to sense a touch on a touch interface. In some embodiments, the memory further is configured to determine a buffer factor from a warm up period of the second sensor. In some embodiments, the memory further is configured to determine first, second, and third zoom factor ranges using the buffer factor, a field of view (FOV) ratio between the first sensor and the second sensor, and a maximum zoom factor of the imaging device. In some embodiments, the first zoom factor range is between 1.0 and a difference between the FOV ratio and the buffer factor. In some embodiments, the second zoom factor range is between a difference between the FOV ratio and the buffer factor and the sum of the FOV ratio and the buffer factor. In some embodiments, the third zoom factor range is between the sum of the FOV ratio and the buffer factor and the maximum zoom factor. In some embodiments, the memory further is configured to turn off one of the first and second sensors when the other of the first and second sensors is sending frames to the camera application when the zoom factor is within either of the first and the third zoom factor ranges. In some embodiments, the memory further is configured to send frames to the camera application from both of the first and second sensors when the zoom factor is within the second zoom factor range.

In another innovation, a system for optimizing operation of dual camera imaging device includes a control module configured to determine a zoom factor selection; determine whether the zoom factor selection falls within a first zoom factor range, a second zoom factor range, or a third zoom factor range; and send a series of frames of a scene captured by a first sensor or a series of frames of the scene captured by a second sensor or both to a camera application based on the determined zoom factor section. In some embodiments, the system further includes a touch interface configured to receive a zoom factor selection. In some embodiments, the control module is further configured to determine a buffer factor from a warm up period of the second sensor. In some embodiments, the control module further is configured to determine first, second, and third zoom factor ranges using the buffer factor, a field of view ratio between the first sensor and the second sensor, and a maximum zoom factor of the imaging device. In some embodiments, the first zoom factor range is between 1.0 and a difference between the field of view ratio and the buffer factor. In some embodiments, the second zoom factor range is between a difference between the field of view ratio and the buffer factor and the sum of the field of view ratio and the buffer factor. In some embodiments, the third zoom factor range is between the sum of the field of view ratio and the buffer factor and the maximum zoom factor. In some embodiments, the control module further is configured to turn off one of the first and second sensors when the other of the first and second sensors is sending frames to the camera application when the zoom factor is within either of the first and the third zoom factor ranges. In some embodiments, the memory further is configured to send frames to the camera application from both of the first and second sensors when the zoom factor is within the second zoom factor range.

In another innovation, a non-transitory computer-readable medium stores instructions that, when executed, cause at least one physical computer processor to perform a method for power optimization of a dual camera imaging device. The method includes the steps of determining a zoom factor selection; determining whether the zoom factor selection falls within a first zoom factor range, a second zoom factor range, or a third zoom factor range; and sending a series of frames of a scene captured by a first sensor or a series of frames of the scene captured by a second sensor or both to a camera application based on the determined zoom factor section. In some embodiments, the method further includes determining a buffer factor from a warm up period of the second sensor. In some embodiments, the method further includes turning off one of the first and second sensors when the other of the first and second sensors is sending frames to the camera application when the zoom factor is within either of the first and the third zoom factor ranges and sending frames to the camera application from both of the first and second sensors when the zoom factor is within the second zoom factor range.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Embodiments relate to power optimization systems and methods for electronic devices that include dual cameras. Devices having dual cameras may include two camera modules and lens systems, for example, a wide-angle camera module having a wide-angle lens and a telephoto camera module having a telephoto lens. The wide-angle lens of the wide-angle camera module has a larger field of view (FOV) than the telephoto lens of the telephoto camera module at the same resolution and size (for example, width and height) of an image. The telephoto camera module is used to capture a narrow field of view of an object in the scene (or scene). An electronic device having dual cameras may operate both cameras simultaneously, thereby increasing power consumption and decreasing battery life of the device.

The systems and methods disclosed herein relate to power optimization for dual cameras, wherein a control system selectively operates either the wide-angle or the telephoto camera module depending on desired optical zoom, while maintaining the overall resolution of the captured image.

It is noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Figure 1:
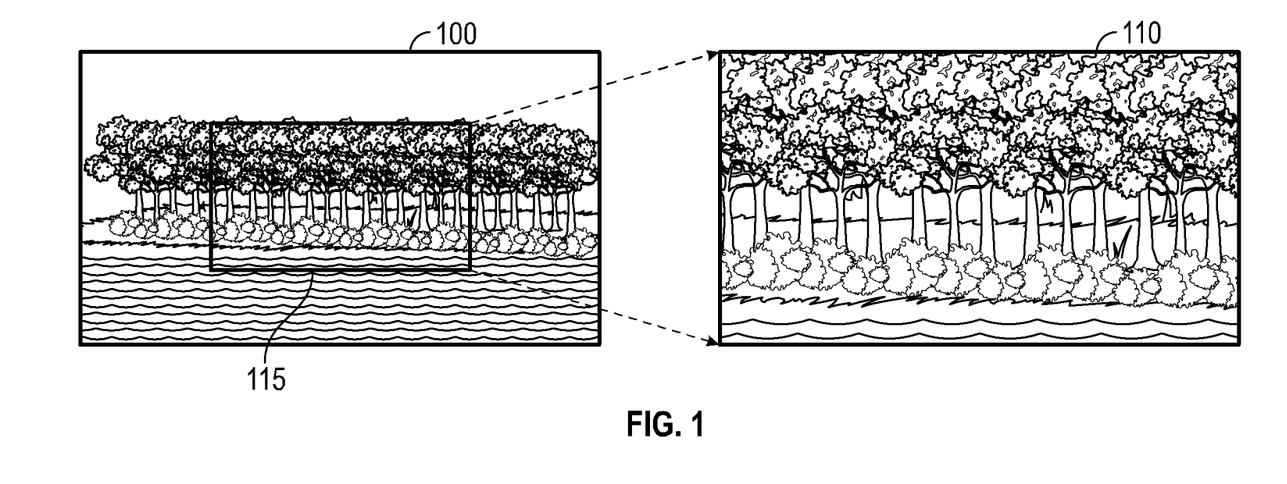
FIG. 1 illustrates two views of a scene as captured by a wide-angle camera and a telephoto camera of a dual camera device according to one embodiment.
Figure 5:
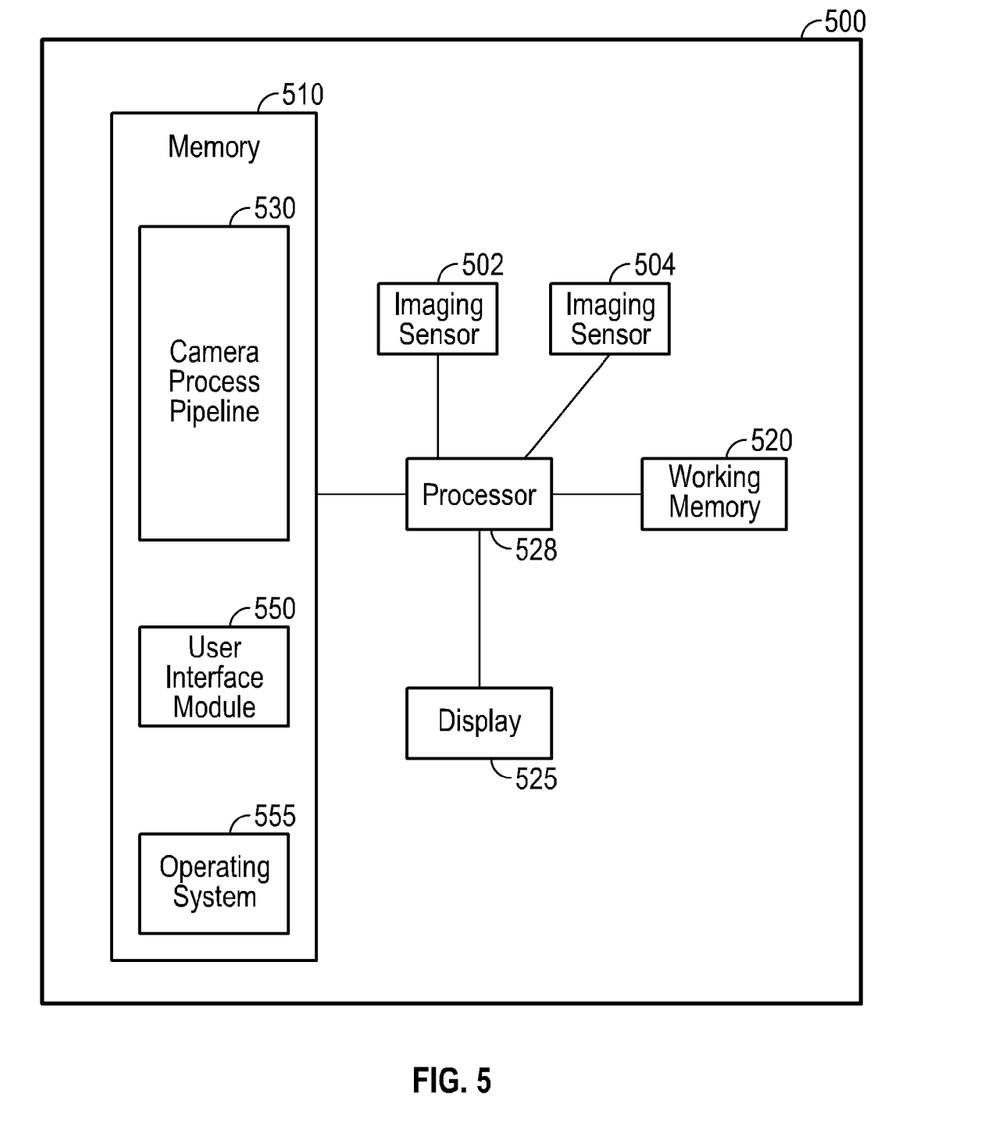
FIG. 5 illustrates a block diagram of an example of a mobile imaging device in accordance with one embodiment.

FIG. 1 illustrates two views of a scene as captured by a wide-angle lens of a dual camera device and a telephoto lens of a dual camera device (for example, a system as illustrated in FIG. 5). A first image 100 was taken using the wide-angle lens and a second image 110 was taken using the telephoto lens, the second image 110 corresponding to a portion 115 of the first image. When using a feature such as optical zoom, normally only one of the images captured by the cameras is displayed to the user. However, dual camera architectures may stream frames from both the wide-angle and the telephoto cameras even though only one is displayed. In the example illustrated in FIG. 1, the wide-angle lens used to take the first image 100 has about twice as much field-of-view as the telephoto lens used to take the second image 110. While both cameras may stream frames to the image processor of the device, until the user inputs a 2× optical zoom factor, the image captured by the wide-angle lens will be displayed. For optical zoom factors greater than a 2× zoom factor, the image captured by the telephoto lens will be displayed.

Figure 2:
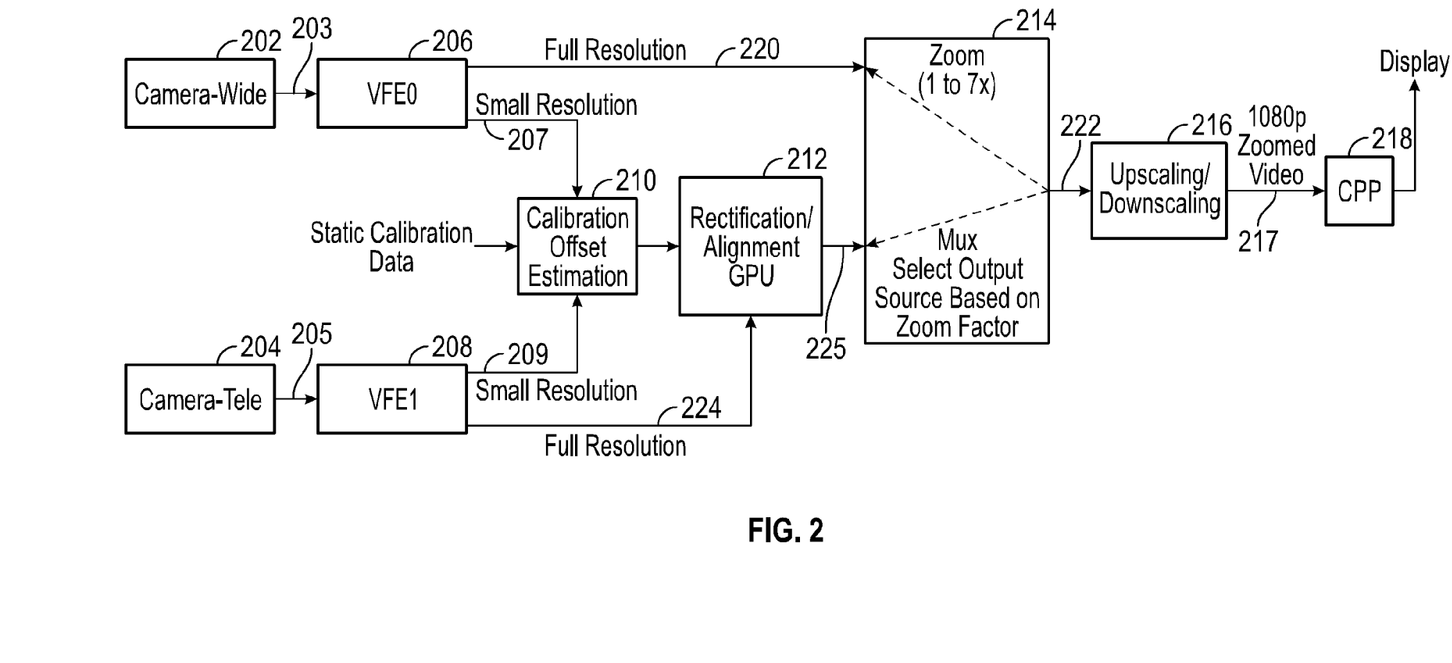
FIG. 2 illustrates an example implementation of an dual camera architecture, according to some embodiments, in which one camera stream may be displayed to a user at a time but both cameras can be operating simultaneously.

FIG. 2 illustrates an example of an implementation of a dual camera architecture in which one camera stream is displayed to a user at a time but both cameras are operating simultaneously. After capturing an image, the output from a wide-angle sensor 202 and a telephoto sensor 204 are sent to separate video front end (VFE) image processing modules. That is, the wide-angle sensor 202 provides image information 203 to a VFE wide-angle image processing module 206, and the telephoto sensor 204 provides image information 205 to the VFE telephoto image processing module 208. The VFE wide-angle processing module 206 provides full resolution of the captured image information as output 220 to a video multiplexer 214, and provides a reduced (or smaller) resolution output 207 to a calibration offset estimation module 210.

The VFE telephoto image processing module 208 provides a full resolution output 224 of the telephoto sensor data to the rectification/Alignment GPU 212, which provides telephoto input data to the video multiplexer 214. The VFE wide angle processing module 206 also provides a reduced (or small) resolution output of the telephoto sensor 204 data to the calibration offset estimation module 210, which aligns the telephoto image data and the wide angle image data. The calibration offset estimation module 210 then provides an output to the rectification/alignment module 212 to provide alignment of the full resolution telephoto data (so that it is aligned with the wide angle data).

The video multiplexer 214 selects either the wide angle sensor data input or the telephoto sensor data input based on a selected zoom factor, and outputs image data 222 (wide angle or telephoto data). The output image data 222 is then sent to processing module 216 for upscaling or downscaling and the resulting output 217 is sent via additional image processing module 218 to a display (not shown). Operation of both cameras simultaneously draws unnecessary power from one of the cameras even if the camera is not being displayed or streamed. As discussed herein, streaming may refer to the CCD array of the camera sending all of the captured frames to the camera application to be displayed to the user.

Figure 3:
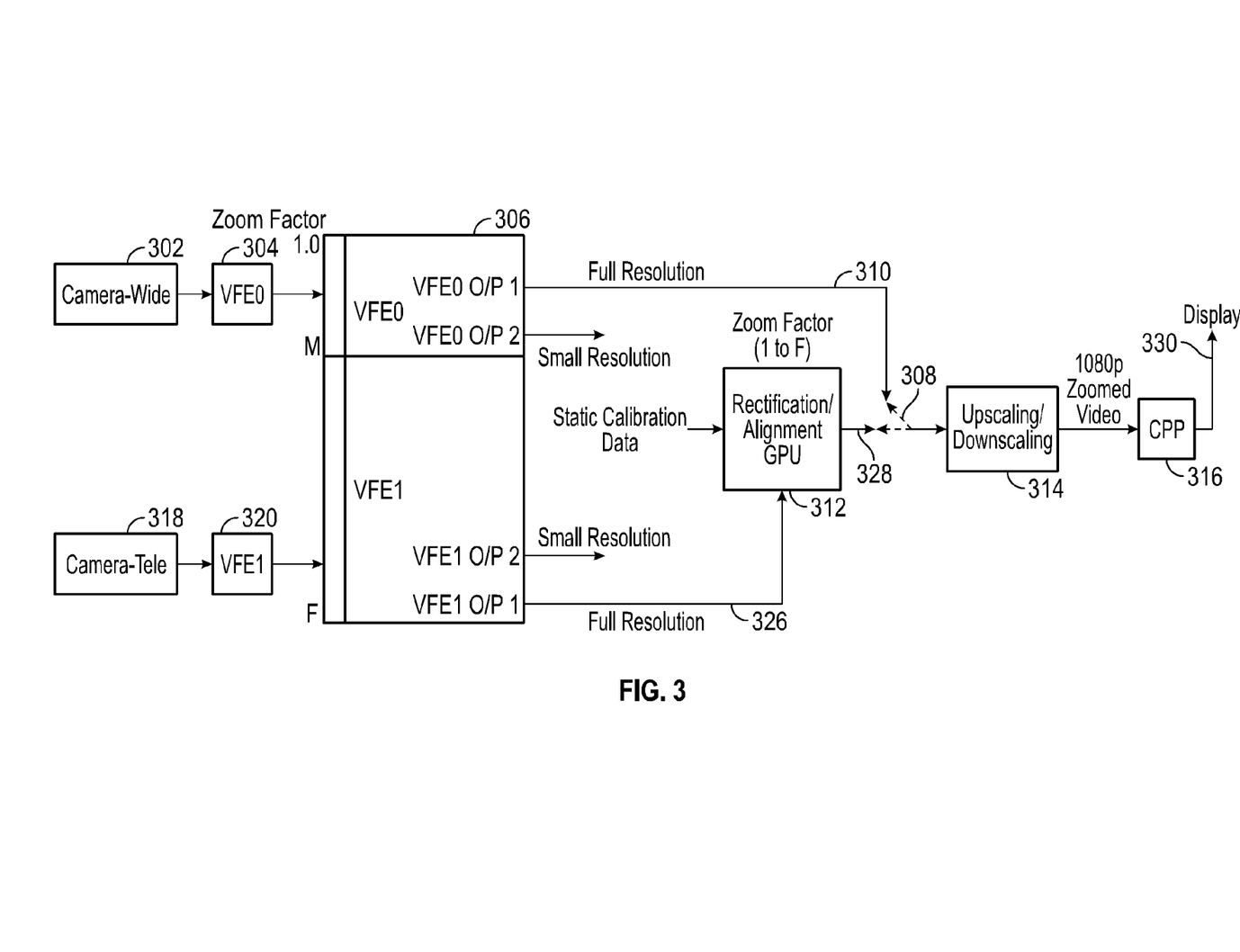
FIG. 3 illustrates an example of a dual camera architecture, according to some embodiments, in which one camera stream may be displayed to a user at a time and the other camera may not be streamed.

FIG. 3 is a schematic illustrating an example of a dual camera architecture embodiment. In this embodiment, the image data output (or streamed) from both of the wide-angle camera 302 and the telephoto camera 318 are not used together to form the image data 330 which is ultimately displayed (or stored). That is, data from only one of the wide-angle camera 302 or the telephoto camera 318 is used to form the display data 330, or be saved in a memory component (not shown). In this embodiment, the wide-angle camera 302 or the telephoto camera 318 that is producing an image data output (stream) that is not being displayed can be turned off to reduce the overall power consumption of the device and thus reduce the overall system load. The streams of each of the cameras 302, 318 are sent to separate video front end modules 304, 320 respectively. Outputs from the video front end modules 304, 320 are sent to a video multiplexer module 306.

As illustrated in FIG. 3, the choice of which camera stream to display to the user is determined at position 308 based on the selected optical zoom factor of the imaging system. In the illustrated embodiment, the zoom factor can range between 1.0× to F×, where F is the maximum zoom factor. The output 310 from the wide-angle camera is streamed when the selected optical zoom factor is between 1.0× and M×, where M is the FOV ratio between the wide-angle lens and the telephoto lens and M<F. When the selected zoom factor is between M× and F×, the output 328 from the telephoto camera is streamed. For example, in one embodiment, M, the FOV ratio between the wide-angle lens and the telephoto lens, may be, for example between 1.5× and 4.0×. In other embodiments, M is approximately 2.0×. In some embodiments, F, the maximum zoom factor, may be, for example, between 4.0× and 7.0×. In other embodiments, F is approximately 6.0×. Both of the wide-angle and telephoto camera streams 310 and 328 may be passed through other image processing modules, for example, modules 314 and 316, before being output 330 and then displayed or stored. In some embodiments, the full resolution image stream 326 from the telephoto camera may be provided to a rectification and alignment module 312 prior to the selection of the image stream at position 308. In some embodiments, the telephoto camera may incur a delay in producing a scene image stream when the user selects the M× zoom factor. Therefore, this embodiment introduces a period of delay in operation that may be undesirable.

Figure 4:
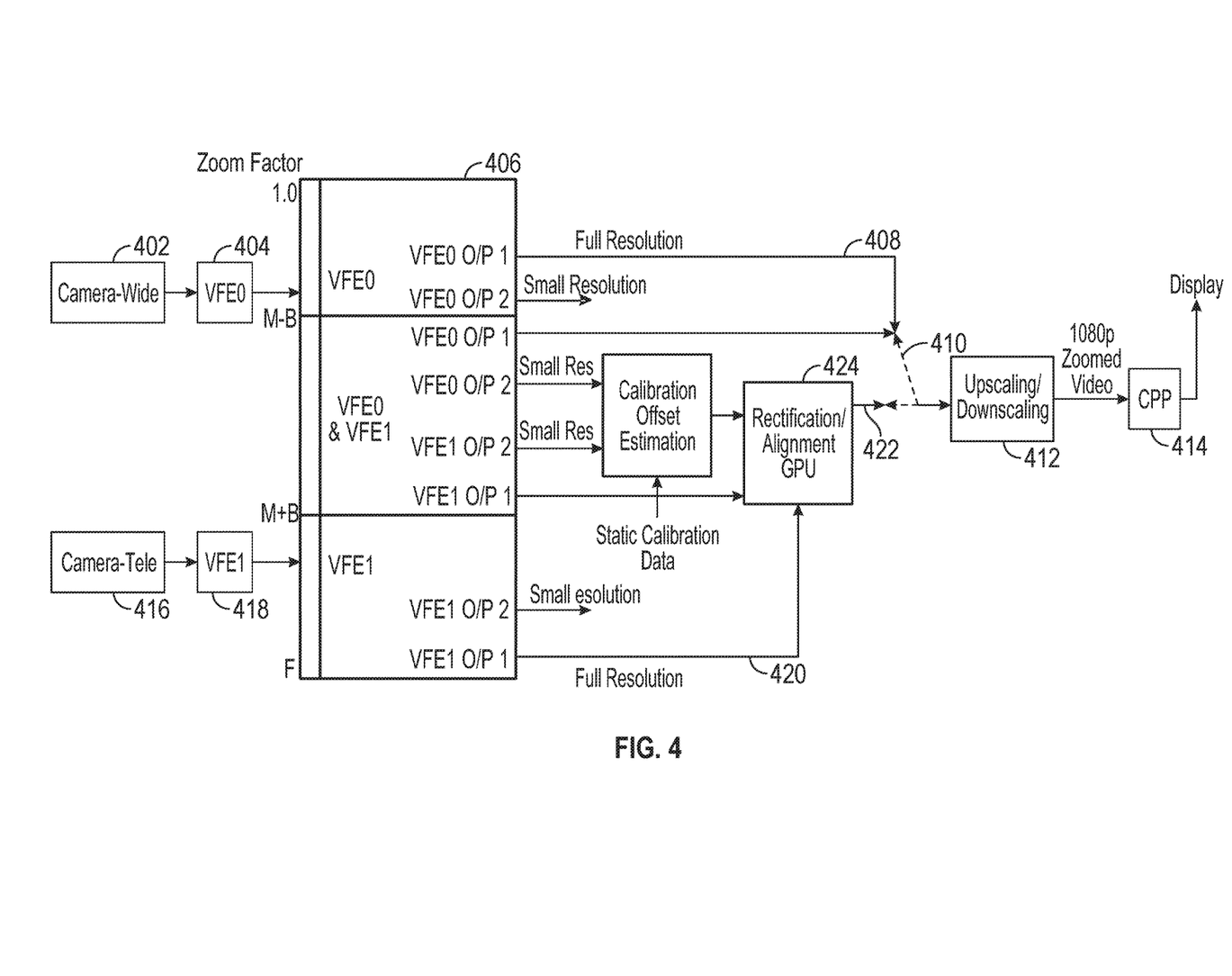
FIG. 4 illustrates another example of the dual camera architecture embodiment illustrated in FIG. 3 which includes a buffer zone in which both cameras may be streamed to reduce latency.

FIG. 4 illustrates a flow diagram of another alternative to the dual camera architecture illustrated in FIG. 2. As in the embodiment shown in FIG. 3, the wide-angle camera 402 and the telephoto camera 416 are not used or displayed at the same time and therefore the stream from the camera not being displayed can be turned off to reduce the power consumption of the device. The streams of each camera 402, 416 are sent to separate video front end modules 404, 418 for processing and then to the video multiplexer module 406. As illustrated in FIG. 4, the choice of which camera stream 408, 422, to display to the user is determined at position 410 based on the selected optical zoom factor. In the illustrated embodiment, the zoom factor can range between 1.0× to F×, where F is a maximum zoom factor. In some embodiments, F may be, for example, between 4.0× and 7.0×. In other embodiments, F is approximately 6.0×. As noted above, one limitation to streaming one camera stream at a time is the lag or delay caused by the telephoto camera's inability to start immediately at the M× zoom factor.

In this embodiment, a buffer factor between 1.0 and F×, defined as B, is a programmable factor which varies based on the telephoto camera sensor's warm up period. As shown in FIG. 4, both the wide angle camera and the telephoto cameras are streamed when the zoom factor is in the range of (M×− B×) to (M×+B×). The output 408 from the wide-angle camera is streamed when the selected optical zoom factor is between 1.0× and (M×−B×). When the selected zoom factor is between (M×+B×) and F×, the output 422 from the telephoto camera is streamed. Both of the camera streams 408 and 422 may be passed through other image processing modules, such as modules 412 and 414, before being sent to a display. In some embodiments, the full resolution image stream 420 from the telephoto camera may be sent to a rectification/alignment module 424 to provide alignment of the full resolution telephoto data prior to selection of the displayed image stream. The zoom range buffer zone (M×−B×) to (M×+B×) preferably absorbs any latency caused by delay in start up of the telephoto camera. The determination of B is based on the sensor start up scheme implemented. For example, if the wide-angle or telephoto sensor is simply on standby then B can be a small value, such as 0.5×. However, when the wide-angle or telephoto sensor is turned off and then started up, the value of B is set to a higher value, such as 1.0×. Setting B to a higher value increases the range at which data from both the wide-angle and the telephoto cameras are streamed, reducing the latency involved in sensor start-up.

FIG. 5 illustrates various components of a mobile device 500 with two camera sensors 502, 504 in accordance with one embodiment of the present disclosure which could perform the optical zoom optimization techniques described herein. The mobile device 500 may be configured to capture, create, process, modify, scale, encode, decode, transmit, store, and display digital images and/or video sequences. The mobile device 500 may represent or be implemented in a device, such as a wireless communication device, a personal digital assistant (PDA), a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), etc. The illustrated embodiment is not meant to be limitative and device 500 may include a variety of other components as required for other functions.

The mobile device 500 may include a first imaging sensor 502, a second imaging sensor 504, a memory 510, a processor 528, a working memory 520, and a display 525. The memory 510 may include various imaging processing modules, including a camera process pipeline 530, a user interface module 550, and operating system 555. The architecture illustrated in FIG. 1 is merely an example. The features and techniques described herein may be implemented with a variety of other architectures.

The sensors 502, 504 may be digital camera sensors. In some embodiments, one of the sensors 502 may be a wide-angle sensor and the other sensor 504 may be a telephoto sensor. The sensors 502, 504 may capture still image snapshots and/or video sequences. Each sensor may include color filter arrays (CFAs) arranged on a surface of individual sensors or sensor elements.

The memory 510 and working memory 520 may store images or video sequences before and after processing. The memory 510 and working memory 520 may include volatile storage and non-volatile storage. The memory 510 and working memory 520 may comprise any type of data storage means, such as dynamic random access memory (DRAM), FLASH memory, NOR or NAND gate memory, or any other data storage technology.

In the illustrated embodiment, the program memory 510 stores a camera process pipeline 530, a user interface module 550, and operating system 555. These modules may include instructions that configure the processor 528 to perform various image processing and device management tasks. The program memory 510 can be any suitable computer-readable storage medium, such as a non-transitory storage medium. Working memory 520 may be used by processor 528 to store a working set of processor instructions contained in the modules of program memory 510. Alternatively, working memory 520 may also be used by processor 528 to store dynamic data created during the operation of the device 500.

The camera process pipeline 530 (also called an engine, module, processing unit, etc.) may comprise a chip set for a mobile phone, which may include hardware, software, firmware, and/or one or more microprocessors, digital signal processors (DSPs), application specific integrated circuits (ASICs), field programmable gate arrays (FPGAs), or various combinations thereof. The camera process pipeline 530 may perform one or more image processing techniques to improve quality of an image and/or a video sequence. For example, the pipeline 530 may perform techniques such as demosaicing, lens rolloff correction, scaling, color correction, color conversion, and spatial filtering. The pipeline 530 may also perform other techniques. The camera process pipeline 530 may be a processor and other imaging processing modules specially configured for use with dual camera architectures such as that shown in FIG. 5. The host processor 528 may be configured to handle the general processing requirements of device 500. The processing pipeline 530 and the host processor 528 may be in communication with each other. Additionally, the camera process pipeline may perform calculations to determine which of a telephoto or wide-angle camera stream to send to a display. As discussed above with respect to FIGS. 3 and 4, the determination of which camera stream to send to the display may be made based on the optical zoom selected by the user. In some embodiments, the sensor not associated with the stream being sent to the display may be placed in stand-by operation or turned off, depending on user selection or power optimization strategies.

Memory 510 also contains user interface module 550. The user interface module 550 includes instructions that configure the processor 528 to provide a collection of on-display objects and soft controls that allow the user to interact with the device. The user interface module 550 also allows applications to interact with the rest of the system in a uniform, abstracted way. Operating system 555 configures the processor 528 to manage the memory and processing resources of device 500. For example, operating system 555 may include device drivers to manage hardware resources such as the electronic display 525 or imaging sensors 502, 504.

The display 525 may include a touch screen component. The display component 525 may be coupled to the host processor 528 for receiving information for visual display to a user. Certain embodiments of display component 514 may be any flat panel display technology, such as an LED, LCD, plasma, or projection screen. Display component 525 may be coupled to the host processor 528 for receiving information for visual display to a user. Such information includes, but is not limited to, visual representations of files stored in a memory of device 500, software applications installed on device 500, user interfaces, and network-accessible content objects.

The processor 528 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Although FIG. 5 depicts a system comprising separate components including a processor, a touch sensor, an electronic display, and memory, one skilled in the art would recognize that these separate components may be combined a variety of ways to achieve particular design objectives. For example, in an alternative embodiment, the memory components may be combined with processor components to save cost and improve performance.

Additionally, although FIG. 5 illustrates two memory components, including memory component 510 comprising several modules and a separate memory 520 comprising a working memory, one with skill in the art would recognize several embodiments utilizing different memory architectures. For example, a design may utilize ROM or static RAM memory for the storage of processor instructions implementing the modules contained in memory 510. Alternatively, processor instructions may be read at system startup from a disk storage device that is integrated into touch sensitive display system 100 or connected via an external device port. The processor instructions may then be loaded into RAM to facilitate execution by the processor. For example, working memory 520 may be a RAM memory, with instructions loaded into working memory 520 before execution by the processor 528.

Figure 6:
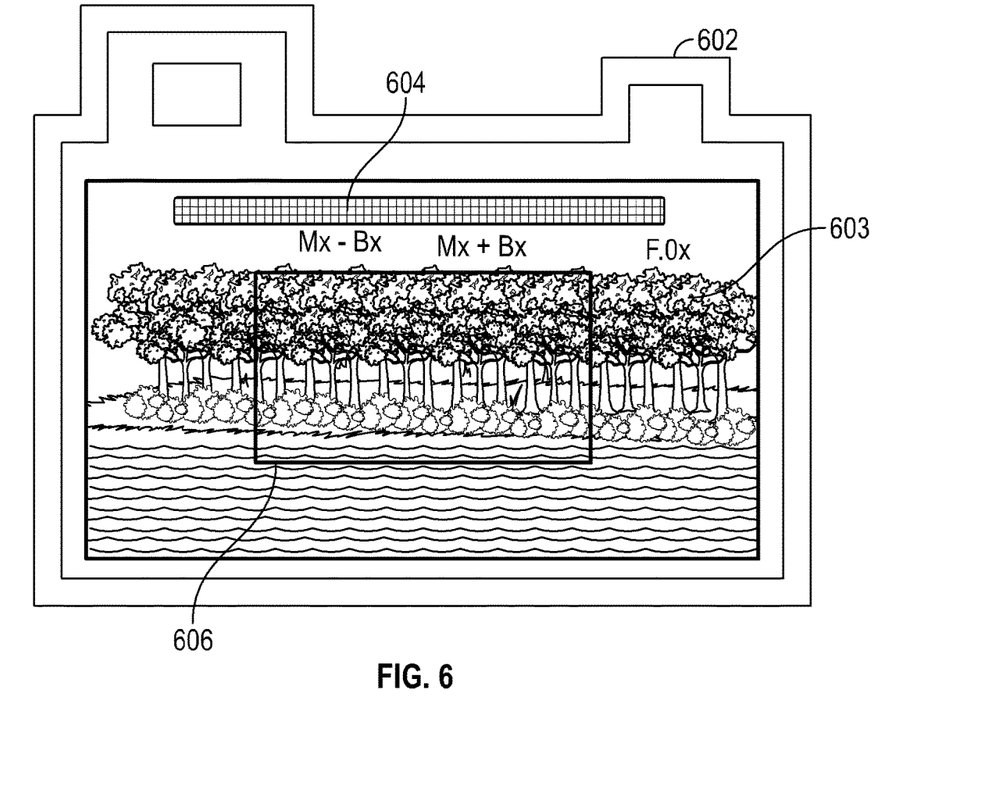
FIG. 6 illustrates one example of a user interface for selecting an optical zoom factor on a mobile imaging device.

FIG. 6 illustrates one embodiment of a user interface 603 for a device 602 having a dual camera architecture. As illustrated, the device 602 has a display screen 603 on which an optical zoom range 604 may be displayed. The user can touch the display to enable a zoom operation, using a pinch to zoom, zoom slide bar, or other means. To indicate a desired optical zoom factor, a user can pinch the screen 603, swipe the range 604, or press a specific point on the range 604. In other embodiments, the user may select an optical zoom factor from a menu listing. A bounded area 606 may be displayed to the user over the captured image to indicate the viewable area of the image at the selected optical zoom factor. As discussed above, the output from the wide-angle camera is streamed when the selected optical zoom factor is between 1.0× and (M×−B×). When the selected zoom factor is between (M×+B×) and F×, the output from the telephoto camera is streamed. When the selected zoom factor is within the range (M×−B×) and (M×+B×), output from both the wide-angle and the telephoto cameras are streamed to reduce any latency that may occur due to a start-up delay of one or the other of the sensors.

Figure 7:
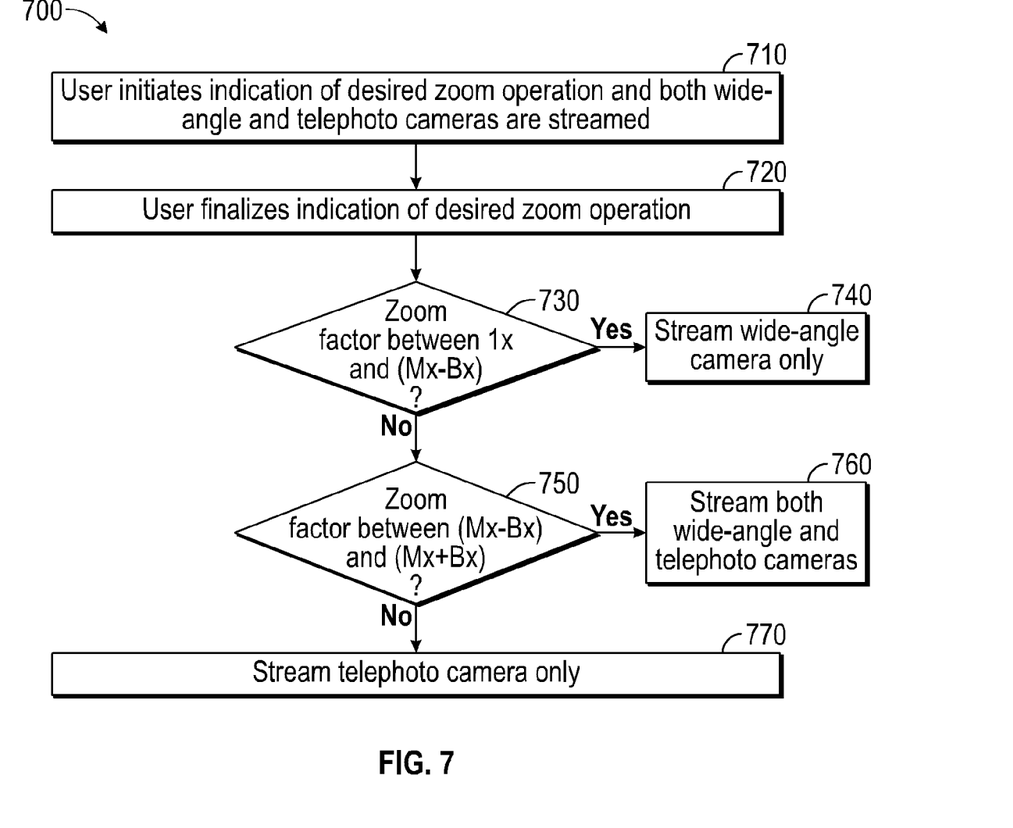
FIG. 7 is a flow chart illustrating an exemplary method of optimizing power on a mobile imaging device having a dual camera architecture using optical zoom selection.

FIG. 7 illustrates a flowchart of an exemplary method 700 to optimize optical zoom operation for a dual camera architecture. Method 700 may be implemented by any suitable devices and systems. Although the method 700 is described herein with reference to a particular order, in various embodiments, blocks herein may be performed in a different order, or omitted, and additional blocks may be added. The illustrated process may be executed by the device and processor described above with respect to FIG. 5.

In an operational block 710 of the method 700, a user initiates a zoom factor operation and both the wide-angle and the telephoto cameras are instructed to stream. The user may, for example, initiate a zoom operation using a pinch to zoom gesture, selecting a position on a slide bar, or selecting a zoom factor from a menu. When the user releases or finalizes the desired selection of a zoom operation by, for example, finishing the pinching gesture, raising a finger from the touch screen, or selecting the zoom factor from the menu, as indicated in operational block 720, process 700 transitions from block 720 to decision block 730 wherein the selected zoom factor is analyzed. If the zoom factor is between 1× and (M×−B×) for embodiments including a buffer optical zoom factor range, only the wide-angle camera is streamed, as shown in block 740. Otherwise, the process 700 transitions to decision block 750 and if the selected zoom factor is instead between (M×−B×) and (M×+B×), both the wide-angle and the telephoto cameras are streamed, as shown in block 760. Otherwise, by process of elimination, the zoom factor is between (M×+B×) and F× and only the telephoto camera is streamed, as shown in block 770.

Clarifications Regarding Terminology

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-3 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. The functionality of the modules may be implemented in some other manner as taught herein. The functionality described herein (for example, with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for power optimization for a dual camera imaging device, the method comprising:
    determining a zoom factor selection for capturing image data;
    determining which one of a first zoom factor range, a second zoom factor range, and a third zoom factor range that the zoom factor selection falls within;
    providing a series of frames of a scene from a first sensor when the zoom factor selection falls within the first zoom factor range;
    providing a series of frames of the scene from a second sensor when the zoom factor selection falls within the third zoom factor range;
    determining a buffer factor B based on a warm up period of the second sensor;
    determining a field of view (FOV) ratio M between the first sensor and the second sensor, wherein the first, second, and third zoom factor ranges are determined based on the buffer factor B, the field of view (FOV) ratio M and a maximum zoom factor F of the dual camera imaging device;
    providing, for streaming to a display of the dual camera imaging device, both a first series of frames of the scene from the first sensor and a second series of frames of the scene from the second sensor when the zoom factor selection falls within the second zoom factor range; and
    turning off one of the first sensor and the second sensor when the zoom factor selection is within the first zoom factor range or the third zoom factor range, and the other of the first sensor and the second sensor is providing the series of frames of the scene.

2. The method of claim 1, further comprising providing the first series of frames of the scene and the second series of frames to a camera application.

3. The method of claim 1, wherein the FOV ratio M is a ratio between a FOV of the first sensor and a FOV of the second sensor and the FOV ratio M is less than the maximum zoom factor F of the imaging device.

4. The method of claim 1, wherein the first zoom factor range is between 1.0 and a difference between the FOV ratio M and the buffer factor B.

5. The method of claim 1, wherein the second zoom factor range is between a difference between the FOV ratio M and the buffer factor B, and the sum of the FOV ratio M and the buffer factor B.

6. The method of claim 1, wherein the third zoom factor range is between the sum of the FOV ratio M and the buffer factor B, and the maximum zoom factor F.

7. An apparatus for optimizing operation of a dual camera imaging device, comprising:
a processor;
a first imaging sensor and a second imaging sensor; and
a memory, operably coupled to the processor, and configured to store processor instructions that configure the processor to:
determine a zoom factor selection for capturing image data;
determine which one of a first zoom factor range, a second zoom factor range, and a third zoom factor range that the zoom factor selection falls within;
provide a series of frames of a scene from the first imaging sensor when the zoom factor selection falls within the first zoom factor range;
provide a series of frames of the scene from the second imaging sensor when the zoom factor selection falls within the third zoom factor range;
provide, for streaming to a display of the dual camera imaging device, both a first series of frames of the scene from the first imaging sensor and a second series of frames of the scene from the second imaging sensor when the zoom factor selection falls within the second zoom factor range;
determine a buffer factor B based on a warm up period of the second imaging sensor;
determine a field of view (FOV) ratio M between the first imaging sensor and the second imaging sensor;
determine the first, second, and third zoom factor ranges based on the buffer factor B, the field of view (FOV) ratio M, and a maximum zoom factor F of the imaging device;
turn off one of the first imaging sensor and the second imaging sensor when the zoom factor selection is within the first zoom factor range or the third zoom factor range, and the other of the first imaging sensor and the second imaging sensor is providing the series of frames.

8. The apparatus of claim 7, wherein the processor instructions further configure the processor to provide the first series of frames from the first imaging sensor and the second series of frames from the second imaging sensor to a camera application.

9. The apparatus of claim 7, wherein the first zoom factor range is between 1.0 and a difference between the FOV ratio M and the buffer factor B, the second zoom factor range is between a difference between the FOV ratio M and the buffer factor B and the sum of the FOV ratio M and the buffer factor B, and the third zoom factor range is between the sum of the FOV ratio M and the buffer factor B and the maximum zoom factor F.

10. A system for optimizing operation of a dual camera imaging device, comprising:
a control module configured to
determine a zoom factor selection for capturing image data;
determine which one of a first zoom factor range, a second zoom factor range, and a third zoom factor range that the zoom factor selection falls within;
provide a series of frames of a scene from a first sensor when the zoom factor selection falls within the first zoom factor range;
provide a series of frames of the scene from a second sensor when the zoom factor selection falls within the third zoom factor range;
determine a buffer factor B based on a warm up period of the second sensor;
determine a field of view (FOV) ratio M between the first sensor and the second sensor;
determine the first, second, and third zoom factor ranges based on the buffer factor B, the FOV ratio M, and a maximum zoom factor F of the imaging device;
provide, for streaming to a display of the dual camera imaging device, both a first series of frames of the scene from the first sensor and a second series of frames of the scene from the second sensor when the zoom factor selection falls within the second zoom factor range; and
turn off one of the first sensor and the second sensor when the zoom factor selection is within the first zoom factor range or the third zoom factor range, and the other of the first sensor and the second sensor is providing the series of frames.

11. The system of claim 10, wherein the control module is further configured to provide the series of frames from the first sensor and the second sensor to a camera application.

12. The system of claim 10, wherein the FOV ratio M is a ratio between a FOV of the first sensor and a FOV of the second sensor, and the FOV ratio M is less than the maximum zoom factor F of the imaging device.

13. The system of claim 12, wherein the first zoom factor range is between 1.0 and a difference between the FOV ratio M and the buffer factor B, the second zoom factor range is between a difference between the field of view ratio B and the buffer factor B and the sum of the field of view ratio M and the buffer factor B, and the third zoom factor range is between the sum of the field of view ratio M and the buffer factor B and the maximum zoom factor F.

14. A non-transitory computer-readable medium storing instructions that, when executed, cause at least one physical computer processor to perform a method for power optimization of a dual camera imaging device, the method comprising:
determining a zoom factor selection for capturing image data;
determining which one of a first zoom factor range, a second zoom factor range, and a third zoom factor range that the zoom factor selection falls within;
determining a buffer factor B based on a warm up period of the second sensor; and
determining a field of view (FOV) ratio M between the first sensor and the second sensor, wherein the first, second, and third zoom factor ranges are determined based on the buffer factor B, the FOV ratio M, and a maximum zoom factor F of the imaging device, and wherein the FOV ratio M is a ratio between a FOV of the first sensor and a FOV of the second sensor and the FOV ratio M is less than the maximum zoom factor F of the imaging device;
providing a series of frames of a scene from a first sensor when the zoom factor selection falls within the first zoom factor range;

providing a series of frames of the scene from a second sensor when the zoom factor selection falls within the third zoom factor range;

providing, for streaming to a display of the dual camera imaging device, both a first series of frames of the scene from the first sensor and a second series of frames of the scene from the second sensor when the zoom factor selection falls within the second zoom factor range; and turning off one of the first sensor and the second sensor when the zoom factor selection is within the first zoom factor range or the third zoom factor range, and the other of the first sensor and the second sensor is providing the series of frames.

15. The non-transitory computer-readable medium of claim 14, wherein said providing a series of frames further comprises providing the series of frames to a camera application.

16. The non-transitory computer-readable medium of claim 14, wherein the first zoom factor range is between 1.0 and a difference between the FOV ratio M and the buffer factor B, the second zoom factor range is between a difference between the FOV ratio M and the buffer factor B and the sum of the FOV ratio M and the buffer factor B, and the third zoom factor range is between the sum of the FOV ratio M and the buffer factor B and the maximum zoom factor F.

17. The method of claim 1, further comprising providing, to a multiplexer, both the first series of frames of the scene from the first sensor and the second series of frames of the scene from the second sensor when the zoom factor selection falls within the second zoom factor range, wherein the multiplexer selects one of the first or second series of frames for output to the display.

* * * * *